Figure 4:
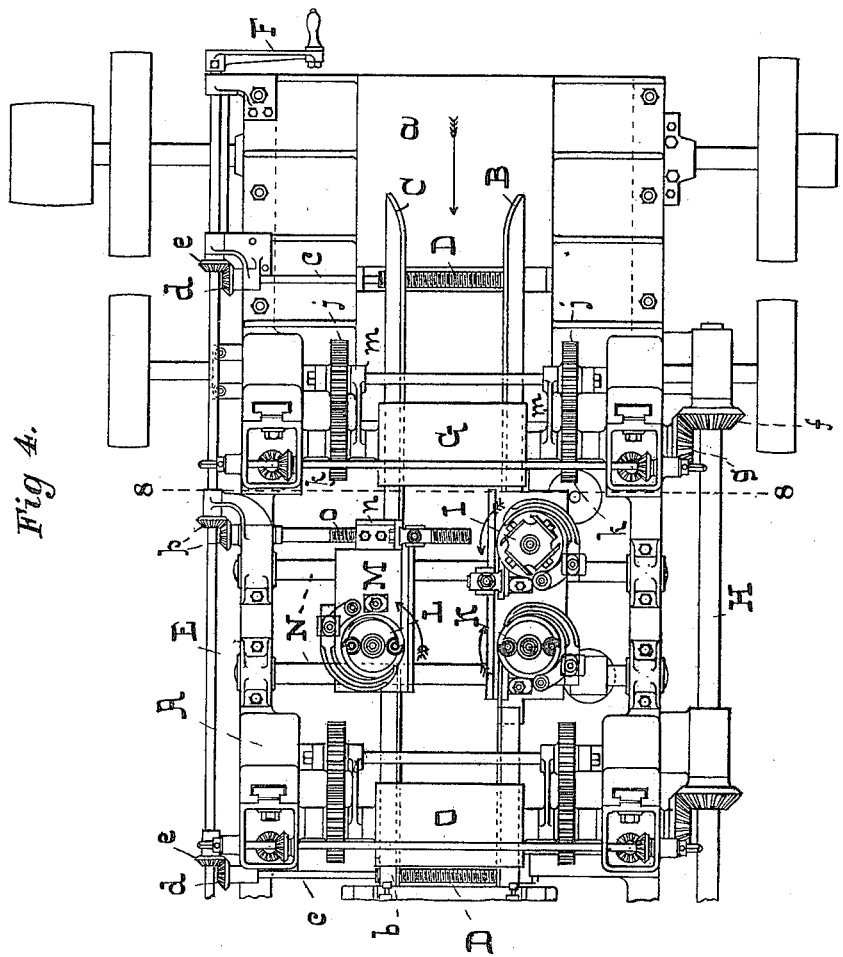

No. 617,023. Patented Jan. 3, 1899.
G. JOHNSON, Jr.
MACHINE FOR MAKING TONGUE AND GROOVE FLOORING.
(Application filed Apr. 20, 1896.)
(No Model.) 16 Sheets—Sheet 1.
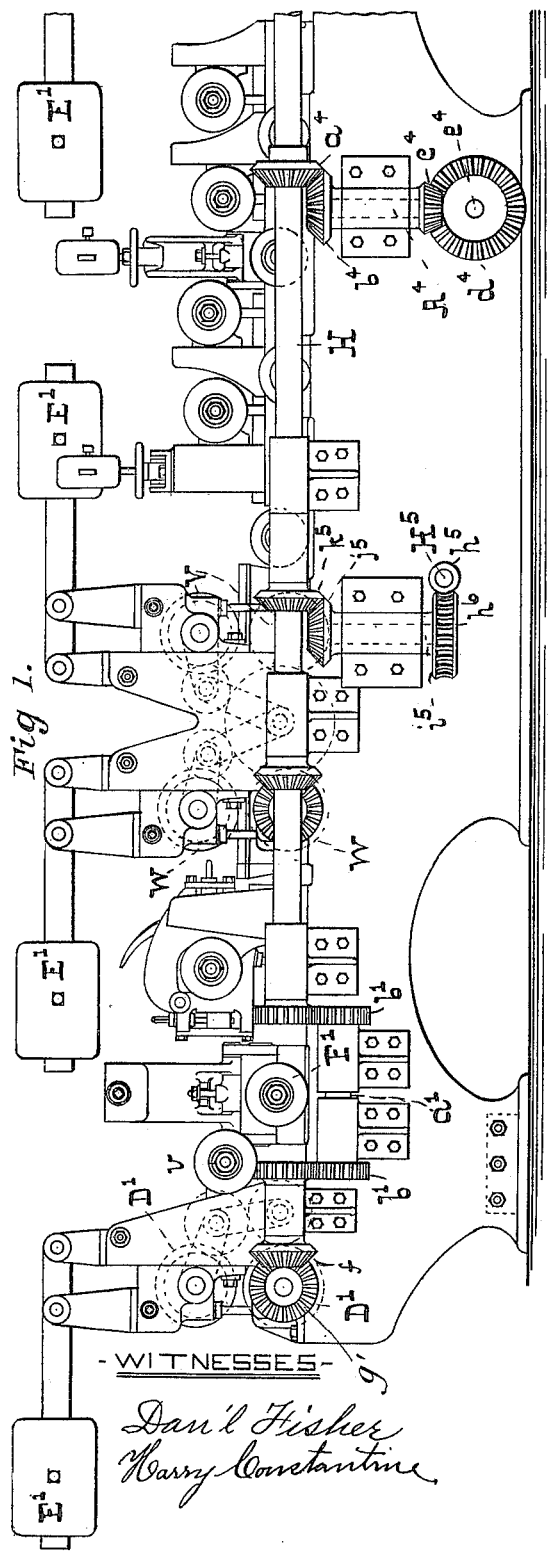
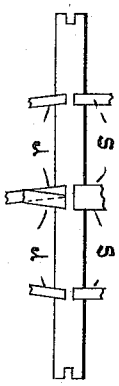
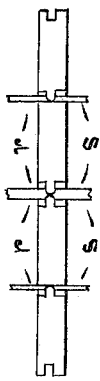
WITNESSES
Dan'l Fisher
Harry Constantine
INVENTOR
Gunleif Johnson, Jr.
by Geo. W. T. Howard
Atty.

No. 617,023. Patented Jan. 3, 1899.
G. JOHNSON, Jr.
MACHINE FOR MAKING TONGUE AND GROOVE FLOORING.
(Application filed Apr. 20, 1896.)
(No Model.) 16 Sheets—Sheet 2.
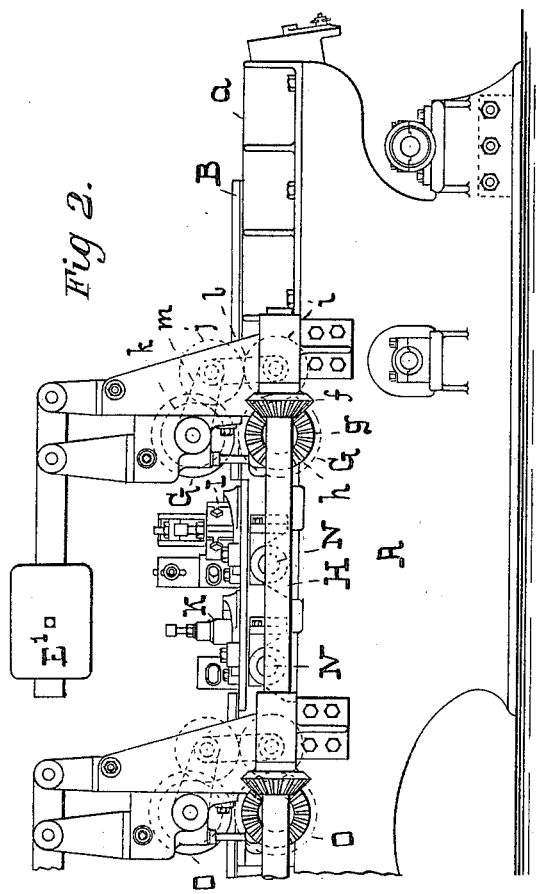
-WITNESSES-
Dan'l Fisher
Harry Constantine,
-INVENTOR-

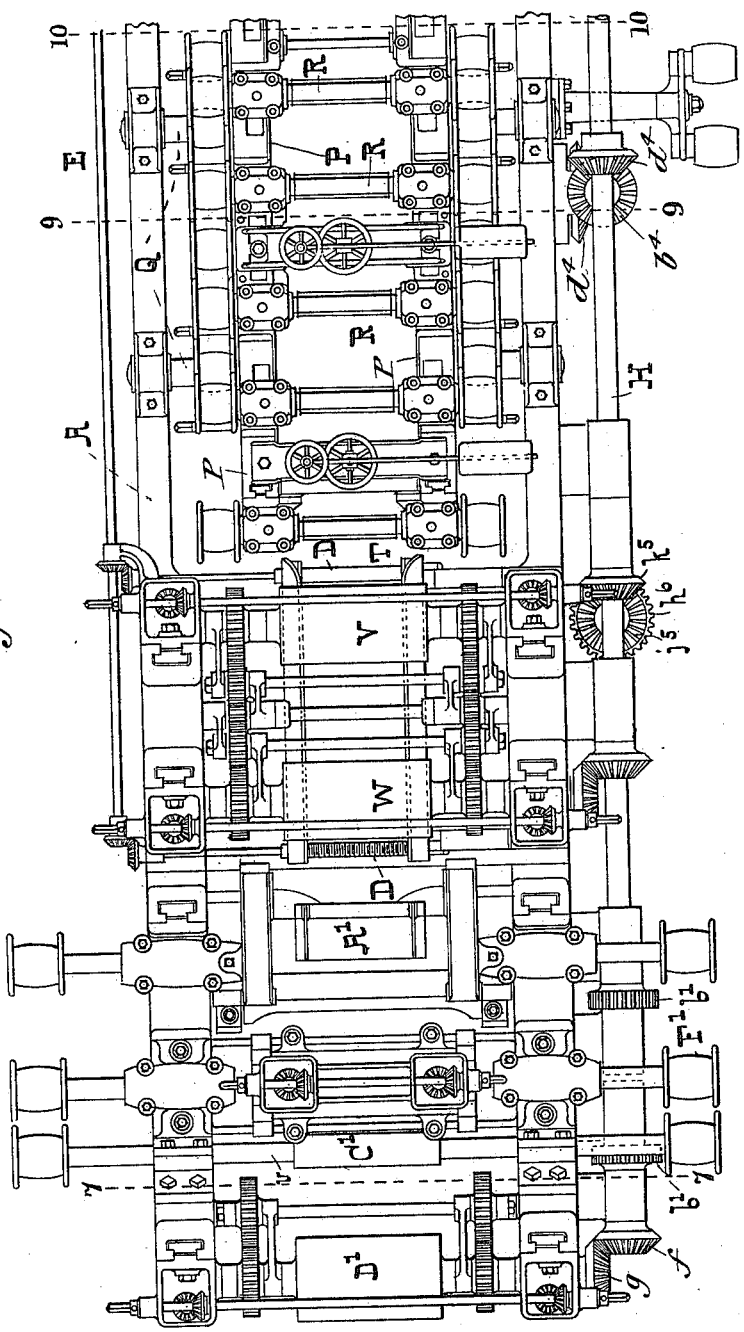

No. 617,023. Patented Jan. 3, 1899.
G. JOHNSON, Jr.
MACHINE FOR MAKING TONGUE AND GROOVE FLOORING.
(Application filed Apr. 20, 1896.)
(No Model.) 16 Sheets—Sheet 4.

-WITNESSES-
Dan'l Fisher
Harry Constantine

-INVENTOR-
Greenleaf Johnson, Jr.

No. 617,023. Patented Jan. 3, 1899.
G. JOHNSON, Jr.
MACHINE FOR MAKING TONGUE AND GROOVE FLOORING.
(Application filed Apr. 20, 1896.)

(No Model.) 16 Sheets—Sheet 5.

No. 617,023. Patented Jan. 3, 1899.
G. JOHNSON, Jr.
MACHINE FOR MAKING TONGUE AND GROOVE FLOORING.
(Application filed Apr. 20, 1896.)
(No Model.) 16 Sheets—Sheet 6.
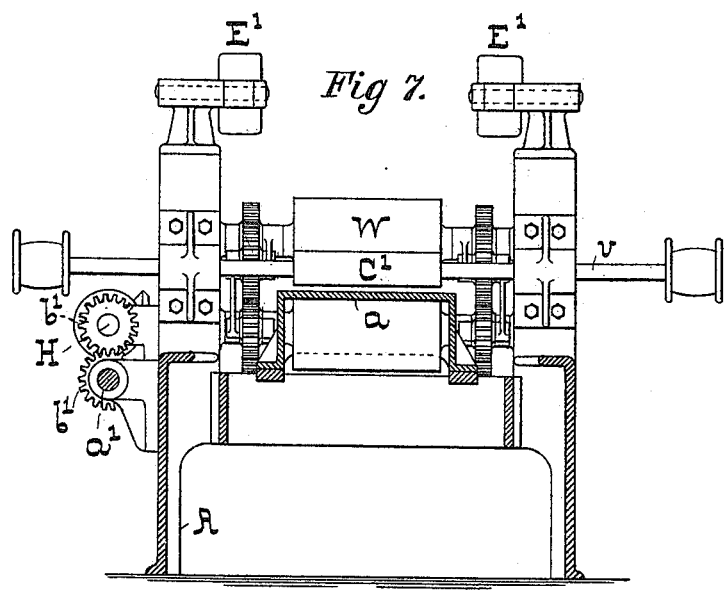
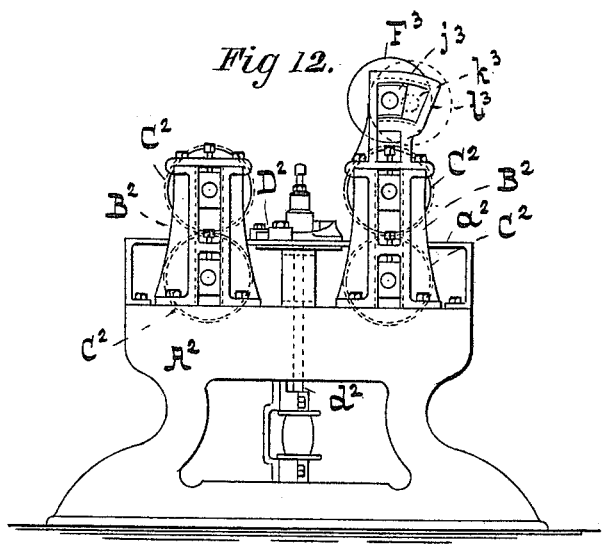

No. 617,023. Patented Jan. 3, 1899.
G. JOHNSON, Jr.
MACHINE FOR MAKING TONGUE AND GROOVE FLOORING.
(Application filed Apr. 20, 1896.)

(No Model.) 16 Sheets—Sheet 7.

No. 617,023. Patented Jan. 3, 1899.
G. JOHNSON, Jr.
MACHINE FOR MAKING TONGUE AND GROOVE FLOORING.
(Application filed Apr. 20, 1896.)
(No Model.) 16 Sheets—Sheet 8.
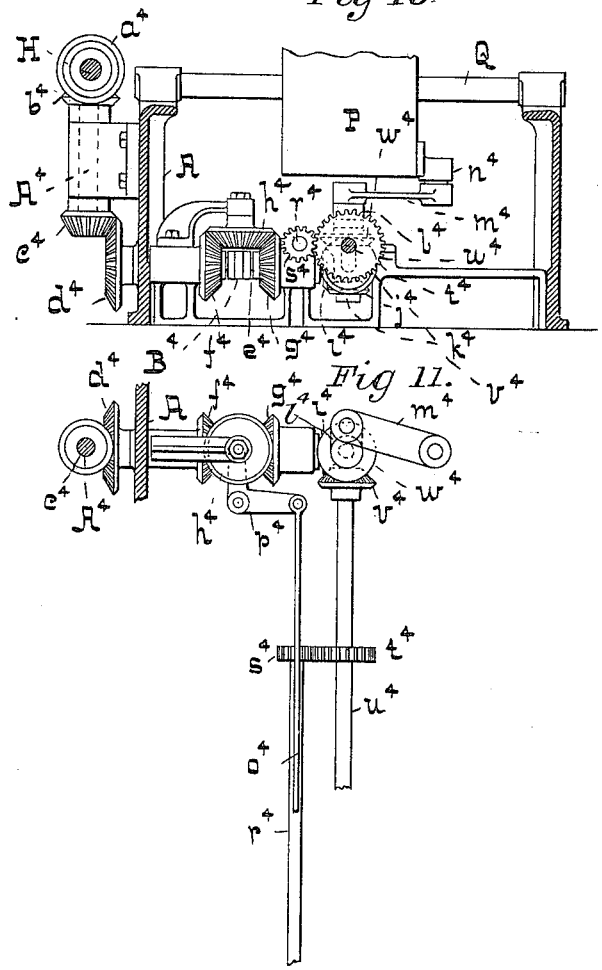
WITNESSES
Dan'l Fisher
Harry Constantine
INVENTOR
Gunleif Johnson, Jr.
by W. T. Howard, atty.

No. 617,023. Patented Jan. 3, 1899.
G. JOHNSON, Jr.
MACHINE FOR MAKING TONGUE AND GROOVE FLOORING.
(Application filed Apr. 20, 1896.)
(No Model.) 16 Sheets—Sheet 9.
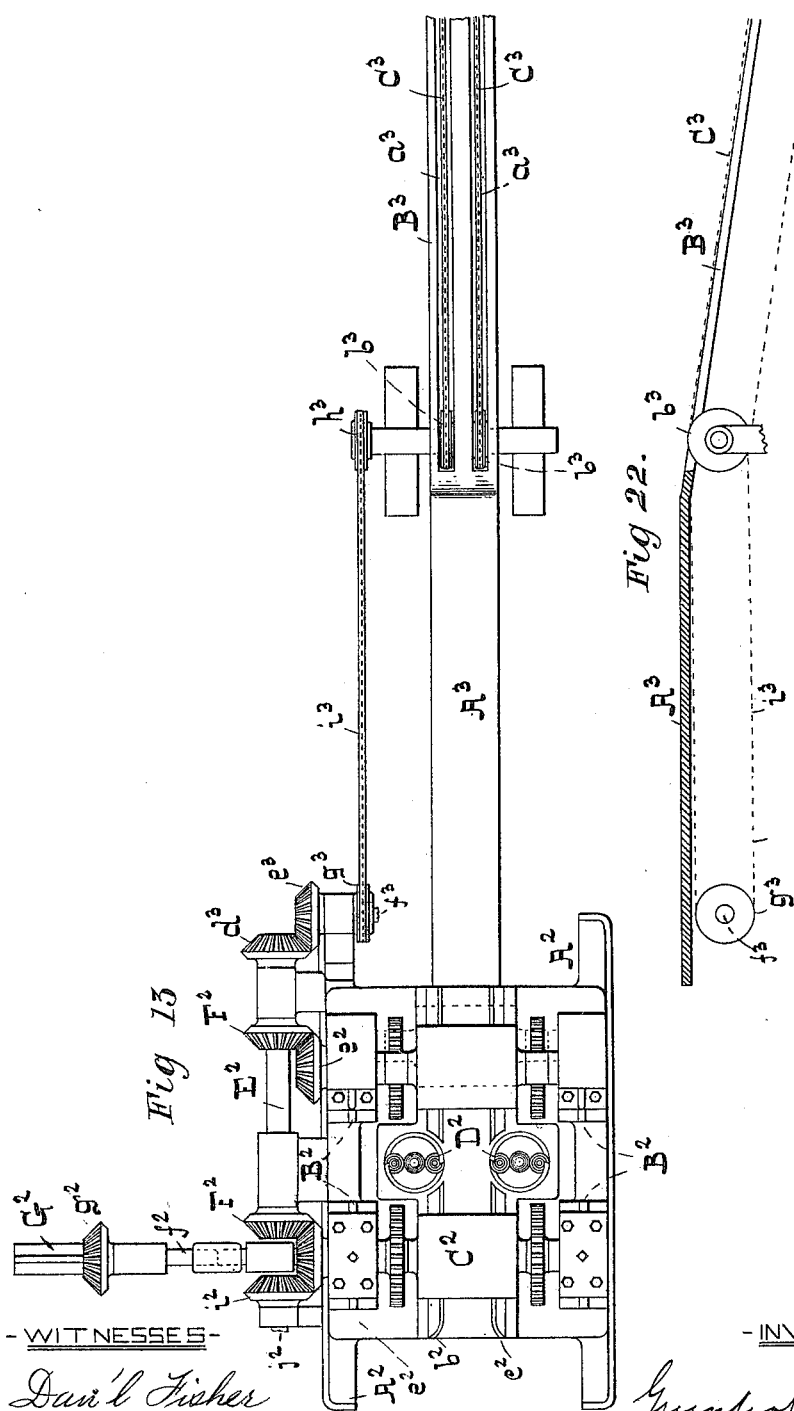

No. 617,023. Patented Jan. 3, 1899.
G. JOHNSON, Jr.
MACHINE FOR MAKING TONGUE AND GROOVE FLOORING.
(Application filed Apr. 20, 1896.)
(No Model.) 16 Sheets—Sheet 10.
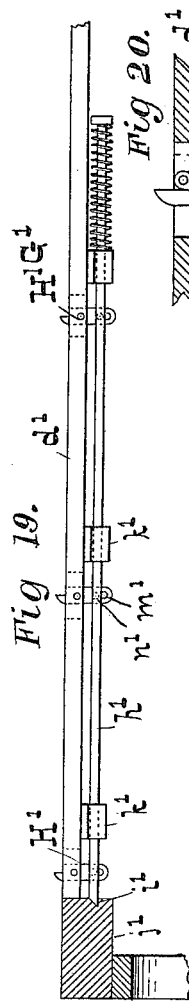
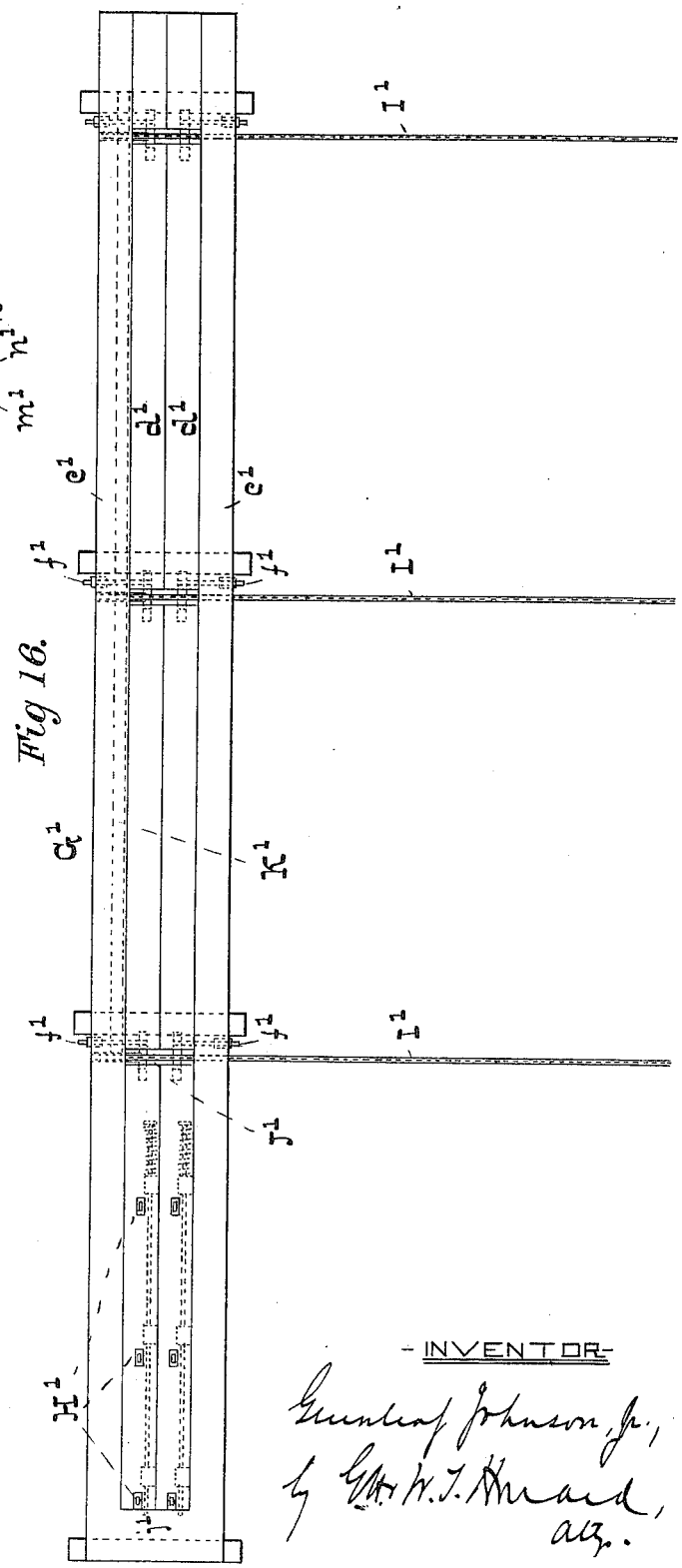

No. 617,023. Patented Jan. 3, 1899.
G. JOHNSON, Jr.
MACHINE FOR MAKING TONGUE AND GROOVE FLOORING.
(Application filed Apr. 20, 1896.)
(No Model.) 16 Sheets—Sheet 11.
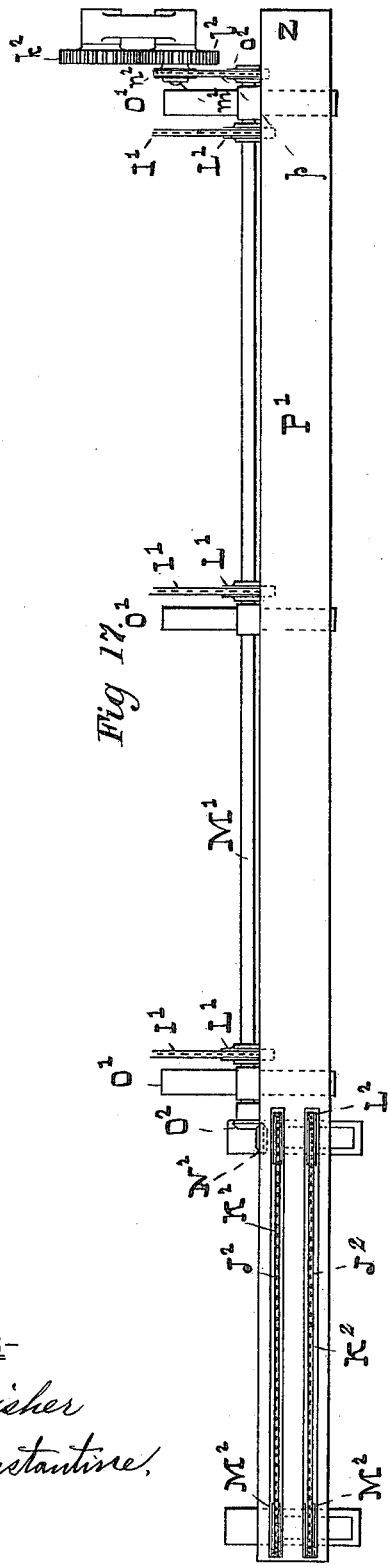

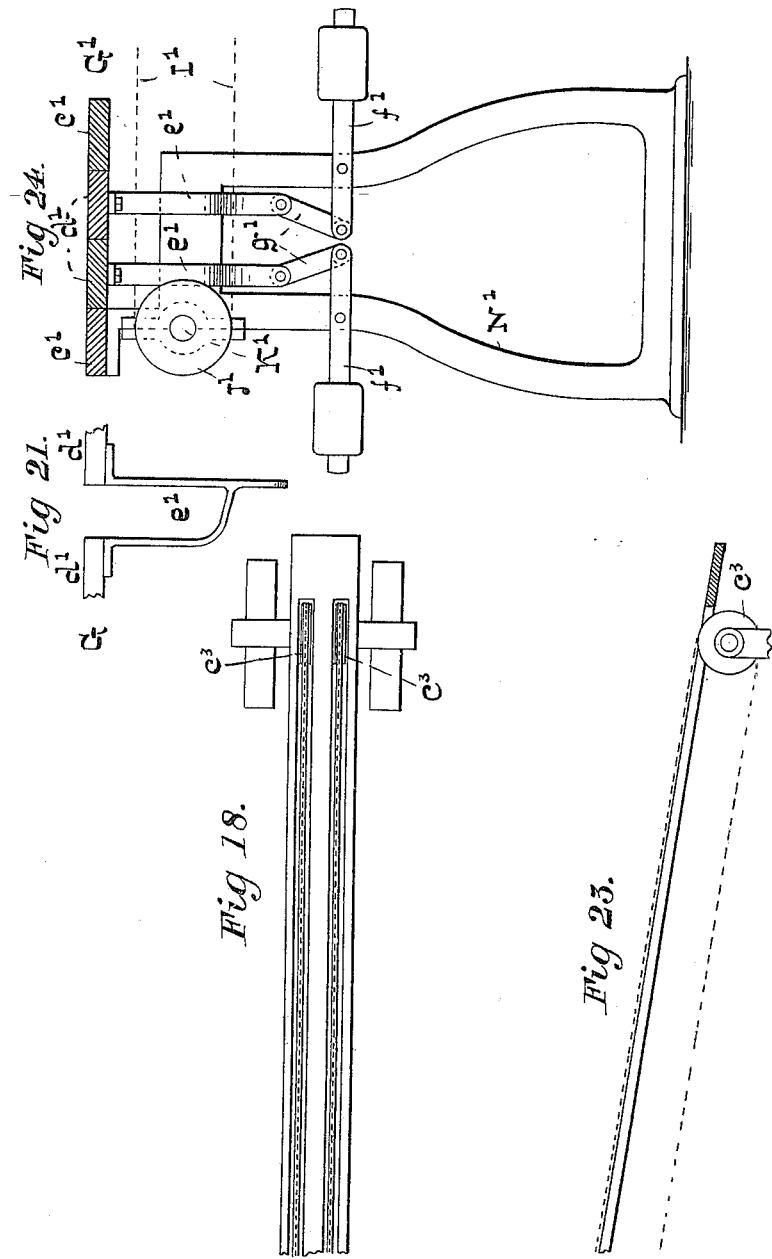

No. 617,023. Patented Jan. 3, 1899.
G. JOHNSON, Jr.
MACHINE FOR MAKING TONGUE AND GROOVE FLOORING.
(Application filed Apr. 20, 1896.)
(No Model.) 16 Sheets—Sheet 13.
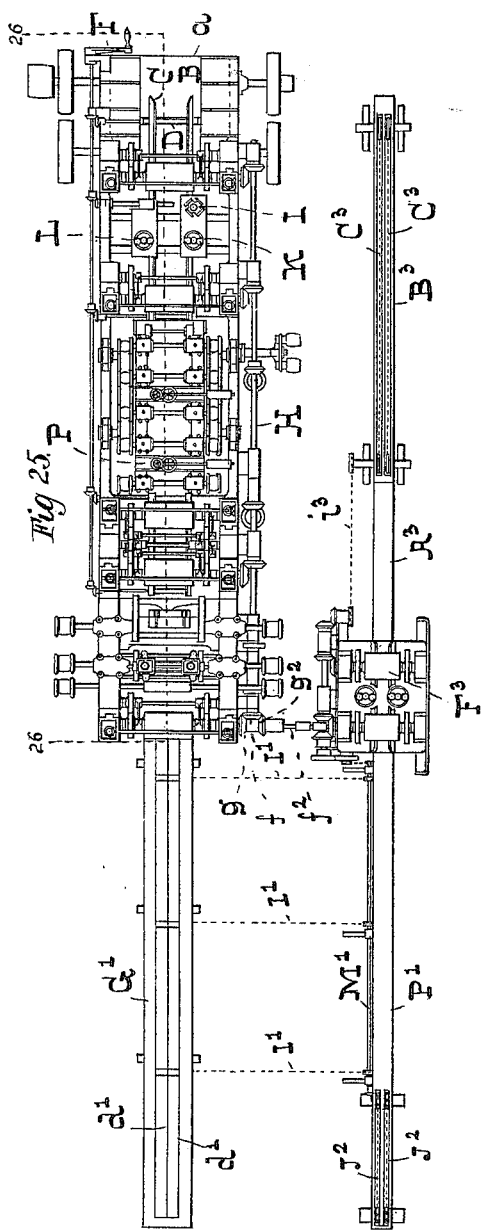
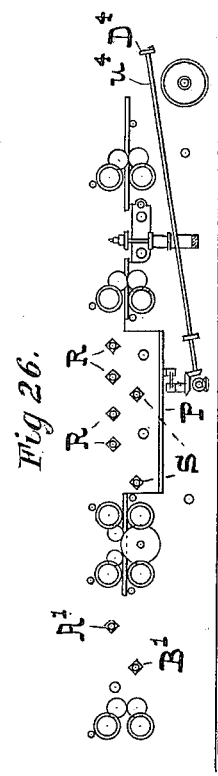

No. 617,023. Patented Jan. 3, 1899.
G. JOHNSON, Jr.
MACHINE FOR MAKING TONGUE AND GROOVE FLOORING.
(Application filed Apr. 20, 1896.)
(No Model.) 16 Sheets—Sheet 14.
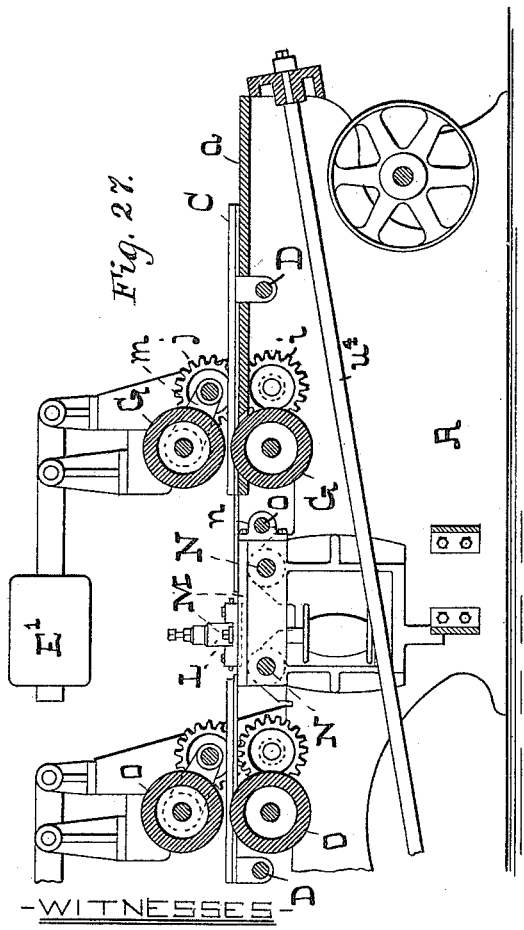

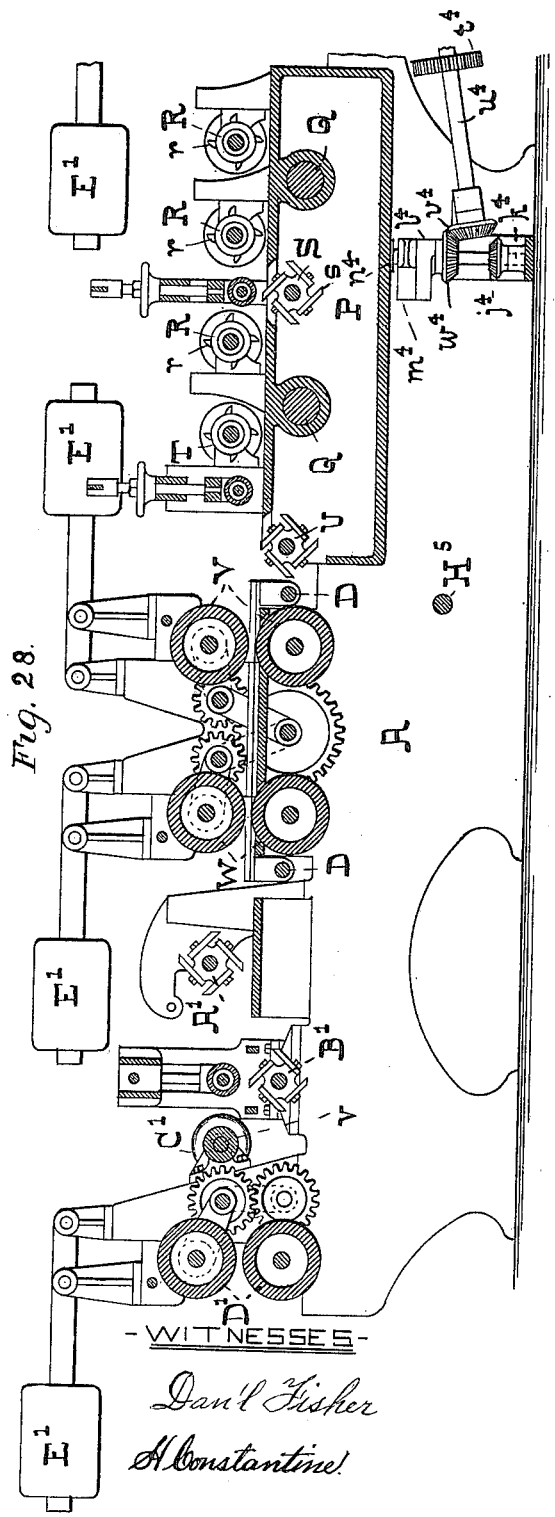

No. 617,023. Patented Jan. 3, 1899.
G. JOHNSON, Jr.
MACHINE FOR MAKING TONGUE AND GROOVE FLOORING.
(Application filed Apr. 20, 1896.)
(No Model.) 16 Sheets—Sheet 16.
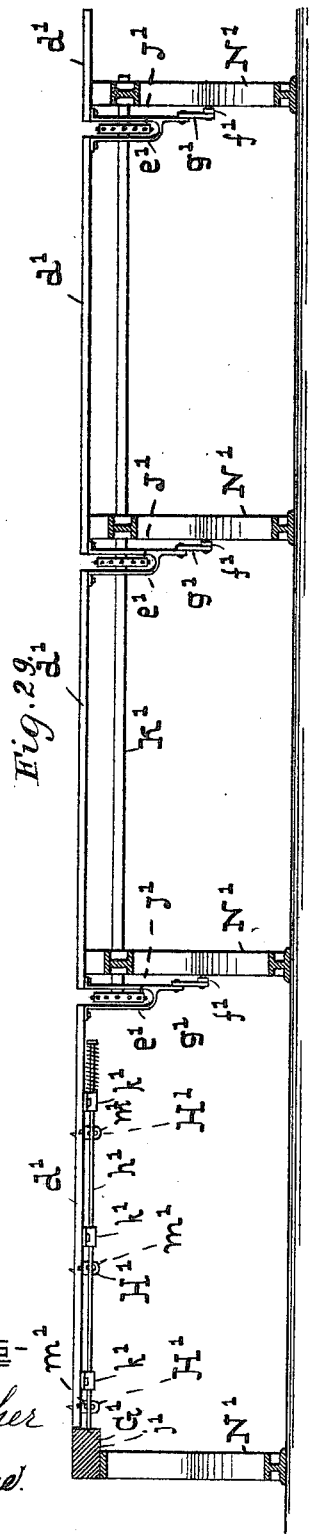
WITNESSES
Dan'l Fisher
A. Constantine
INVENTOR
Gunleaf Johnson, Jr.
by Geo. W. J. Howard
Atty.

UNITED STATES PATENT OFFICE.

GREENLEAF JOHNSON, JR., OF BALTIMORE, MARYLAND.

MACHINE FOR MAKING TONGUE-AND-GROOVE FLOORING.

SPECIFICATION forming part of Letters Patent No. 617,023, dated January 3, 1899.

Application filed April 20, 1896. Serial No. 588,224. (No model.)

*To all whom it may concern:*

Be it known that I, GREENLEAF JOHNSON, Jr., of the city of Baltimore and State of Maryland, have invented certain Improvements in Machines for Making Tongue-and-Groove Flooring, of which the following is a specification.

In the description of the invention which follows reference is made to the accompanying drawings, forming a part hereof, and in which—

Figure 5:
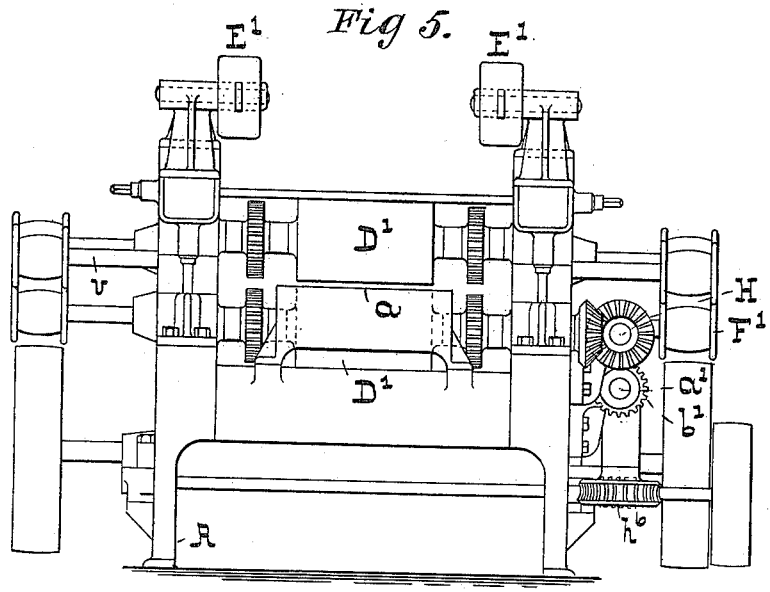
Figure 6:
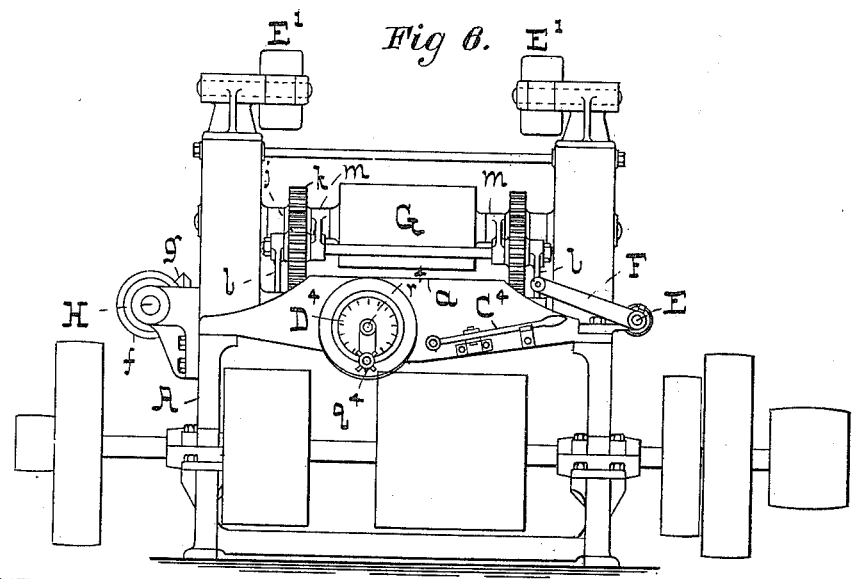
Figure 8:
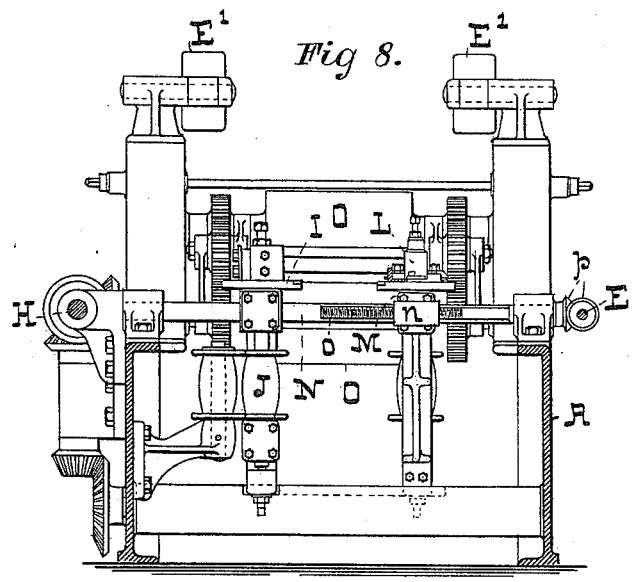
Figure 9:
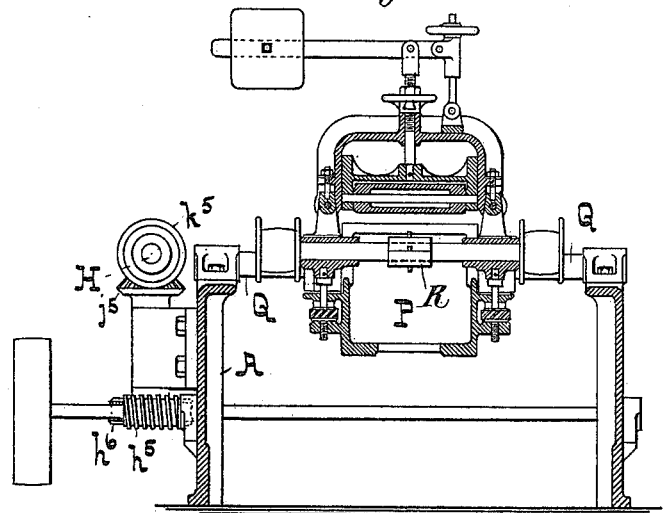

Figures 1 and 2, taken together, show an exterior side view of the main portion of the machine—that is to say, the portion of the machine whereby a plank placed therein is reduced to some standard width, then grooved at each edge, then divided or separated into boards, which are in the same operation provided with tongues, then dressed and their upper surface polished. Figs. 3 and 4, taken together, show a plan of Figs. 1 and 2, except that certain levers and their weights, which hold down the upper feed-rolls, are omitted. Fig. 5 is a rear end view of the said part of the machine. Fig. 6 is a front end of the same. Fig. 7 is a cross-section of Fig. 3, taken on the dotted line 7 7. Fig. 8 is a cross-section of Fig. 4, taken on the dotted line 8 8. Fig. 9 is a cross-section of Fig. 3, taken on the dotted line 9 9. Fig. 10 is a cross-section of Fig. 1, taken on the dotted line 10 10. Fig. 11 is a top view of certain parts shown in Fig. 10. Fig. 12 is an exterior side view of the secondary part of the machine. Fig. 13 is a plan of the secondary part of the machine. Figs. 14 and 15 are enlarged views of the end of the boards, showing the various cutting-knives in position. Figs. 16 to 18, inclusive, represent plan views of certain transferring devices whereby certain of the boards or those unprovided with grooves are transferred from the main portion of the machine to the secondary part. Fig. 19 is an enlarged longitudinal section of a part of the transferring devices. Figs. 20 and 21 are enlarged details of the transferring portion of the machine. Figs. 22 and 23, taken together, represent a longitudinal section of Figs. 13 and 18. Fig. 24 is an enlarged cross-section of Fig. 16. Fig. 25 is a plan, on a much-reduced scale, of the entire machine; and Fig. 26, a skeleton section of Fig. 25, taken on the dotted line 26 26.

Figs. 27, 28, and 29, taken together, represent a central longitudinal section of Figs. 4, 3, and 16.

Referring now to Figs. 1 to 11, inclusive, A is the frame, having a bed-plate $a$, over which the plank and the boards into which the plank is cut are carried in the operation of the machine.

B is a fixed guide secured in any suitable manner to the top surface of the bed-plate $a$.

C is the laterally-adjustable guide, situated opposite the fixed one B and, like it, resting on the bed-plate $a$. This adjustable guide has nuts $b$, through which pass the screws D, forming parts of the shafts $c$. The shafts $c$ are provided with miter-gears $d$, which engage with similar miter-gears $e$ on a side shaft E, supported in suitable bearing-boxes and adapted to be turned by hand through the medium of a crank-handle F. (See Figs. 4 and 6.)

By means of the screw mechanism described the space between the fixed and movable guides is set to some standard width or the width of the rough plank to be placed between them.

G G represent the first pair of feed-rolls, consisting, as is usual, of an upper and lower one. These feed-rolls, in common with other similar ones, are driven from a shaft H, extending longitudinally of the bed-plate, through the medium of the miter-gears $f$ and $g$, the former being on the side shaft and the latter on the gudgeon of the lower feed-roll. The shaft H is driven from the shaft $H^5$ by means of the worm $h^5$, worm-wheel $h^6$, the vertical shaft $i^5$, and the miter-gears $j^5$ and $k^5$. The upper feed-roll is driven from the lower one by the spur-gears $h$, $i$, $j$, and $k$, and the ones $i$ and $j$ are on studs united by links $l$ and $m$ to the gudgeons of the two rolls, as ordinarily arranged in machines of this class, for the purpose of allowing the upper feed-roll to have vertical movement or one to and from the lower roll.

I is an edging cutter-head driven, as is usual, by a driving-pulley J. (See Fig. 8.) The direction of its revolution is indicated by a curved arrow in Fig. 4. It will be seen that the direction of rotation of the cutter-head is such that the knives thereof cut with the board—that is to say, the direction of movement of the board and the cutting-knives is the same.

The object in making the cutter-head revolve in the direction described is to make the knives leave the wood without meeting with the resistance usually met with, and the tearing of the wood ahead of the knives is entirely prevented.

K is the fixed grooving cutter-head, situated on the same side of the machine as is the edging-cutter I. It is supported and driven in the usual manner.

L is a grooving cutter-head adjustable in position by means of a nut $n$, secured to the bearing M for the cutter-head, and a screw $o$, which runs in the nut $n$, and is driven from the side shaft E by means of miter-gears $p$. The bearing M is supported by and slides on two guide-bars N, which extend across the frame A. The means for revolving the cutter-head are similar to those ordinarily employed.

By reference to Fig. 4 it will be seen that the cutter-heads I, K, and L are in alinement with the guides B and C. Consequently these guides are separated into two lengths to provide a space for a cutter-head and also that the cutter-head L may move with the adjustable guide C.

O O are the second feed-rolls, driven from the side shaft H in the same manner as are the ones G before referred to.

P is a carriage consisting of a frame adapted to slide transversely of the machine on stationary bars Q. This carriage carries the upper and lower channeling and board-separating cutter-heads about to be described.

R and S are respectively the upper and the lower channeling cutter-heads which produce the channels. (Shown in Figs. 14 and 15, in which the knives of the head are denoted by $r$ and $s$.) The shafts of the upper heads R are slightly angular in position with reference to a horizontal line in order that the knives will have an undercut, as shown in Fig. 14, while the lower heads are on horizontally-placed shafts.

T and U are respectively the upper and the lower dividing or separating cutters which sever the material left by the knives $r$ and $s$, and thereby reduce the plank into boards, all of which have tongues and the outside ones grooves. (See Fig. 15.) The cutter-heads just described are driven in the usual manner.

V and W are the next pairs of feed-rolls, driven from the side shaft H in the same manner as the others described.

A' and B' are the upper and lower dressing cutter-heads of ordinary description and driven in the usual way.

C' is a polishing-roll consisting of a cylindrical body having a hard smooth surface. It is secured to a shaft $v$, which is revolved at a high rate of speed. Its office is to bear with considerable weight or force on the surfaced boards and in its rapid revolution slightly compress them and by forcing down the raised grain of the wood and leveling the minute ridges in the same left by the surfacing-cutters produce a hard smooth or polished surface.

D' D' are the last feed-rolls, which are at the delivery end of the machine.

By reference to Figs. 1 and 2 it will be seen that each upper feed-roll has two separate and independent weights E' on suitable levers, so that the rolls will adjust themselves properly to the upper surface of the boards and the plank from which the boards are made. As the driving-pulley F' comes in alinement with the side shaft H, I separate the shaft at that point and connect the ends by means of a short shaft $a'$ and the gear-wheels $b'$. This is well shown in Fig. 1.

G' is a table (see Figs. 16 and 19) with its top in alinement with the bed $a$ of the main portion of the machine just described. Its inner end abuts the delivery end of the bed-plate $a$. The table-top consists of the fixed frame-plate $c'$ and the intermediate plates $d'$, which are adapted to fall or drop under circumstances hereinafter described. The intermediate plates are in separated lengths, the adjoining lengths being connected by the stirrups $e'$. (See Figs. 21 and 24, the one 21 being on a still further enlarged scale.) The intermediate plates $d'$, connected by the stirrups $e'$, as described, are yieldingly supported, with their upper surfaces fair or in alinement with the upper faces of the side or stationary plates $c'$, by means of the weighted levers $f'$ and links $g'$, which latter are hinged to the stirrups $e'$. A side view of one of these stirrups is shown in Fig. 21. The movable or dropping plates $d'$ are locked when in their highest position by means of the spring-held bolts $h'$, the pointed ends of which enter suitable holes $i'$ in the rear end piece $j'$, which connects the side or fixed plates $c'$. The bolts $h'$ are directly under the dropping-plates $d'$ and adapted to slide in suitable guides $k'$, fastened to the said plates. (See Figs. 18 and 19.)

H' H' are triggers hinged in openings in the dropping-plates $d'$, with their lower ends provided with slots $m'$, through which pass pins $n'$, projecting from the bolts $h'$. The upper ends of the triggers are loose and connected to the lower parts by means of rule-joints, which allow the said upper ends to move in one direction only—that is to say, the backward direction—independently of the triggers proper, but to cause the movement of the triggers entire when pushed in a forward direction. When any one of the series of triggers on any plate $d'$ is pushed in a forward direction, the bolt $h'$ locking the said plate is forced back and the plate will fall, provided any weight is placed thereon sufficient to overcome the weighted levers $f'$.

I' I' are endless chain belts carried at one end by the idle sprocket-wheels J' on a shaft K' and at the other end by the driving sprocket-wheels L' on a shaft M', both shafts being free to turn in suitable bearing-boxes forming parts of the stands N' and O'. The stands O' support a table P', which is at the side of the plates c' and parallel with them, but removed from them a considerable distance, as will be seen by placing Fig. 17 underneath Fig. 16. At the end Z of the table P' is the secondary part of the machine before briefly alluded to in the description of the figures of the drawings. This part of the machine consists of a frame $A^2$, having at its upper end a plate $a^2$, which has the same elevation as the plate $a$ of the main portion of the machine.

$B^2$ $B^2$ are stands bolted to the frame $A^2$, carrying the gudgeon of the two pairs of feed-rolls $C^2$. These feed-rolls are in alinement with the table P'.

The plate $a^2$ has guides $b^2$ and $c^2$, the latter being adjustable with reference to the former.

$D^2$ $D^2$ are cutter-heads on vertical shafts $d^2$, suitably supported, adapted to cut a groove in the edge of a board placed between the guides $b^2$ and $c^2$. The cutter-head next to the movable guide $c^2$ is susceptible of lateral adjustment with reference to the other, so that boards of different widths may be grooved.

In order to drive the lower feed-rolls of the secondary part of the machine, it is provided with a side shaft $E^2$, carrying miter-gears $F^2$, in engagement with similar miter-gears $e^2$ on the gudgeons of the lower feed-rolls $C^2$. One of the gudgeons is connected by a shaft $f^2$ and a miter gear-wheel $g^2$ to the miter gear-wheel $f$ on the end of the main side shaft H of the first part of the machine.

$G^2$ in Fig. 13 represents a bracket to support the end of the shaft $f^2$ from the frame A of the first part of the machine, and to fully understand the relative positions of the first and secondary parts of the machine Fig. 13 should be placed below Fig. 3.

Referring now to Figs. 13 and 17, it will be seen that the shaft M' derives its movement from the miter gear-wheel $e^2$ through the medium of the similar miter-wheel $i^2$ on a short shaft $j^2$, the spur-gears $k^2$ and $l^2$, the latter being on a stud $m^2$, the sprocket-wheels $n^2$ and $o^2$, and the chain belt $p^2$.

To fully understand the connection between the two parts of the machine, Fig. 16 should be placed to the left of Fig. 13. At the rear end of the table P' are two endless chain belts $J^2$, the upper sections of which are in slots $K^2$ in the table. These sections of the chain project slightly above the surface of the table, so that an object placed thereon is carried toward the front end of the table. The endless chain belts $J^2$ are on sprocket-wheels $L^2$ and $M^2$, the former being the drivers and the latter the idlers. The shaft of the sprocket-wheels $L^2$ has a miter gear-wheel $N^2$ in mesh with a similar miter-gear $O^2$ on the rear end of the shaft M'. At the front of the secondary part of the machine is a table $A^3$, having an inclined end $B^3$, provided with slots $a^3$.

$C^3$ $C^3$ are endless chain belts, the upper sections of which are in the slots $a^3$. The said chains are on sprocket-wheels $b^3$ and $c^3$, the shafts of which are in suitable bearing-boxes. The shaft of the sprocket-wheels $b^3$ is driven from the shaft $E^2$ by means of the miter-gears $d^3$ and $e^3$, the shaft $f^3$, the sprockets $g^3$ and $h^3$, and the chain belt $i^3$.

Referring now to Fig. 12, it will be seen that over the upper feed-roll $C^2$ is an idle feed-roll $F^3$, the bearing-boxes $j^3$ for the gudgeons of which are in curved slots $k^3$ in extensions $l^3$ of the stands $B^2$. The slots are so shaped and placed that the feed-roll $F^3$ has a tendency to fall to the position shown by its dotted delineation in Fig. 12. The space between the rolls $F^3$ and $C^2$ is in alinement with the surface of the inclined portion of the table $B^3$, and to it the ends of the intermediate finished boards are finally led, as will appear in the description of the operation of the machine.

Figs. 10 and 11 show the devices for moving the carriage P, carrying the channeling cutter-heads transversely of the machine and toward and from the fixed guide, and also the mechanism for registering the position of the carriage, so that it can be seen at a glance into what widths of boards the plank will be cut. To effect this, the side shaft H is provided with a miter-gear $a^4$, in engagement with another $b^4$ on a vertical shaft $A^4$. (Shown in dotted lines in Figs. 1 and 10.) To the lower end of the short vertical shaft $A^4$ is fastened a miter-pinion $c^4$, in mesh with a beveled wheel $d^4$ on a counter-shaft $e^4$. The counter-shaft $e^4$ is journaled within the frame A and carries the loose miter gear-wheels $f^4$ and $g^4$, having clutch-faces. Between these and above them is a third miter gear-wheel $h^4$ on a stud. At the inner end of the shaft $e^4$ is a small beveled pinion $i^4$, in gear with a beveled gear-wheel $j^4$ on a short vertical shaft $k^4$. To the upper end of this short vertical shaft $k^4$ is secured an arm $l^4$, the outer end of which is pivoted to a link $m^4$, jointed to a lug $n^4$ on the lower edge of the sliding carriage P.

$B^4$ is a clutch arranged to slide on a feather on the shaft $e^4$, adapted to engage with either of the clutch-faces of the miter-gears $f^4$ and $g^4$. The clutch is moved from the front end of the machine to place in revolution either one of the miter gear-wheels $f^4$ or $g^4$ by means of a hand-lever $C^4$, (see Fig. 6,) a rod $o^4$ jointed to the hand-lever, and a bell-crank $p^4$. It will be seen that by moving the hand-lever $C^4$ toward or from the machine the clutch may be thrown in contact with either of the clutch-faced miter gear-wheels $f^4$ or $g^4$ and the carriage made to move either to the right or left.

$D^4$ is a dial-plate, having a finger $q^4$ on a shaft $r^4$, which extends back, and at its inner end it is fitted with a spur-pinion $s^4$, in mesh with a spur-wheel $t^4$ on a short shaft $u^4$, having at its inner end a beveled pinion $v^4$, in engagement with a beveled gear-wheel $w^4$ on the short vertical shaft $k^4$. By this arrangement the position of the carriage is always registered by the finger $q^4$ on the dial-plate $D^4$, which is suitably marked.

Supposing the machine to be in operation, the adjustable guide is so placed as to suit the width of the plank to be operated upon. The movable carriage carrying the channeling and separating cutters is also adjusted to suit the plank by means of the mechanism described. The plank is then run through the first part of the machine, and its edge to the left, when looking in the direction indicated by the straight arrow in Fig 4, is edged by the cutter I. As the plank advances both edges are grooved by the cutters K and L, and then the plank is channeled at both sides by the cutters R and S and divided at the channels by the cutters T and U into, say, four boards, the two outer ones having each a tongue and a groove and the inner ones tongues only. The four boards are then dressed at both sides by the cutters A' and B'. The boards are discharged to the plates $c'$ and $d'$, and the ends of the two inner ones, which are unfinished, striking against the triggers set to receive them, fall with their supporting-plates. The boards are caught by the laterally-moving chain belts I' and transferred to the table P', with their forward ends resting on the longitudinally-moving chain belts $J^2$ and $K^2$, which carry them longitudinally to the secondary part of the machine. In entering this part of the machine the boards pass between the feed-rolls and guides, and in their passage are provided with the grooves required to complete them. The completed boards pass to the table $A^3$, and finally tilt onto the inclined chains $C^3$, which carry them back until their ends enter the space between the upper feed-roll $C^2$ and idle roll $F^3$ of the secondary part of the machine, where they are caught by hand and carried away clear of the machine.

From the foregoing description it will be understood that all the movements of the boards are automatically effected, no hand labor being necessary except that required to place the rough plank in the first part of the machine.

I claim as my invention—

1. In a machine for making tongue-and-groove flooring, the combination of a frame, stationary bars extending from one side of the frame to the other and attached thereto, a laterally-moving carriage adapted to slide on the said bars, carrying the upper and lower channeling and separating cutter-heads, an arm on a revoluble shaft, a pin on the carriage, a link to connect the pin on the carriage with the end of the arm, and means to revolve or partially revolve the said revoluble shaft, substantially as specified.

2. In a machine for making tongue-and-groove flooring, the combination of two sets of upper and lower feed-rolls to carry boards, and a rapidly-revolving polishing-roll placed above the boards and situated between the two sets of feed-rolls, substantially as specified.

3. A machine for making tongue-and-groove flooring, which consists of a first section or part embodying a bed, edging and grooving cutter-heads, channeling and separating heads, and dressing cutter-heads, combined with a secondary section or part embodying grooving cutter-heads, the said sections or parts being placed side by side, and a transferring apparatus situated between them whereby certain of the boards are carried from the first to the secondary section, substantially as specified.

4. A machine for making tongue-and-groove flooring, consisting of a first section or part embodying a bed, edging and grooving cutter-heads, channeling and separating cutter-heads, and dressing cutter-heads, combined with a secondary section or part, embodying grooving cutter-heads, mechanism to separate the boards unprovided with grooves from the others and convey them laterally to the secondary section of the machine, a table to receive the boards grooved by the secondary machine having a portion of its length inclined and provided with endless chain belts in slots whereby the finished boards are carried back over one of the feed-rolls of the secondary section, substantially as specified.

5. In an apparatus for the lateral conveyance of certain boards delivered thereto, from the others, a table having plates with means to drop them below the surface of the table, combined with laterally-moving endless chain belts to receive the boards as dropped and carry them from beneath the table, substantially as specified.

6. In an apparatus to receive boards from a machine for making tongue-and-groove flooring, and to separate certain of the boards from the others, and move them laterally away, the combination of a table to which all the said boards are conveyed, having dropping-plates which form parts of the said table, means to yieldingly support the said movable sections or plates locking devices to temporarily hold the movable plates in alinement with the remaining portion of the table, triggers to disengage the locking devices, and moving endless chain belts to receive and carry off laterally, the boards delivered to the said chains by the yielding plates, substantially as specified.

GREENLEAF JOHNSON, JR.

Witnesses:
DANL. FISHER,
WM. T. HOWARD.